US012465958B2

(12) United States Patent
Lee

(10) Patent No.: US 12,465,958 B2
(45) Date of Patent: Nov. 11, 2025

(54) ULTRASONIC CLEANING UNIT WITH IMPROVED CLEANING PERFORMANCE, AND SUBSTRATE CLEANING APPARATUS INCLUDING THE SAME

(71) Applicant: DEVICE CO., Ltd., Cheonan-si (KR)

(72) Inventor: Taek Youb Lee, Cheonan-si (KR)

(73) Assignee: DEVICE CO., Ltd, Cheonan-si (KR)

( * ) Notice: Subject to any disclaimer, the term of this patent is extended or adjusted under 35 U.S.C. 154(b) by 209 days.

(21) Appl. No.: 18/358,059

(22) Filed: Jul. 25, 2023

(65) Prior Publication Data

US 2024/0066562 A1 Feb. 29, 2024

(30) Foreign Application Priority Data

Aug. 31, 2022 (KR) ........................ 10-2022-0110219

(51) Int. Cl.
*B08B 3/12* (2006.01)

(52) U.S. Cl.
CPC ..................................... *B08B 3/12* (2013.01)

(58) Field of Classification Search
CPC ........................................................ B08B 3/12
See application file for complete search history.

(56) References Cited

U.S. PATENT DOCUMENTS 6,791,242 B2 * 9/2004 Beck ...................... H04R 23/00 310/367
7,938,131 B2 * 5/2011 Hahn ................ H01L 21/67051 118/316
8,327,861 B2 * 12/2012 Yin ................... H01L 21/67086 134/94.1
9,796,000 B2 * 10/2017 Beck ................. H01L 21/67051
9,953,847 B2 * 4/2018 Liu ................... H01L 21/67057
9,987,666 B2 * 6/2018 Korbler ..................... B08B 3/12
11,554,389 B2 * 1/2023 Kubo ........................ B08B 1/36
2005/0003737 A1 * 1/2005 Montierth ......... H01L 21/67057 451/5
2006/0070641 A1 * 4/2006 Kim .......................... B08B 3/12 134/186
2008/0017219 A1 * 1/2008 Franklin .................. B08B 3/12 134/1

FOREIGN PATENT DOCUMENTS

JP 2011029315 A * 2/2011
KR 1020080093281 A 10/2008

* cited by examiner

*Primary Examiner* — Benjamin L Osterhout
(74) *Attorney, Agent, or Firm* — NKL Law; Jae Youn Kim

(57) ABSTRACT

The present invention relates to an ultrasonic cleaning unit with improved cleaning performance, which can improve overall substrate cleaning performance through improvement in the structure of a cleaning head of the ultrasonic cleaning unit, and the ultrasonic cleaning unit includes: a driving unit for receiving external power and vibrating an internal vibrator; and a cleaning head formed to protrude downward from a bottom of the driving unit to be acoustically coupled to the vibrator to transfer high-frequency acoustic energy to a cleaning liquid on a substrate, and an arc section formed to have a curvature corresponding to an outer circle of the substrate is included in an edge of a bottom surface of the cleaning head.

6 Claims, 9 Drawing Sheets

ULTRASONIC CLEANING UNIT WITH IMPROVED CLEANING PERFORMANCE, AND SUBSTRATE CLEANING APPARATUS INCLUDING THE SAME

BACKGROUND OF THE INVENTION

Field of the Invention

The present invention relates to an ultrasonic cleaning unit with improved cleaning performance and a substrate cleaning apparatus including the same, and more particularly, to an ultrasonic cleaning unit with improved cleaning performance and a substrate cleaning apparatus including the same, which can improve overall substrate cleaning performance through improvement in the structure of a cleaning head of the ultrasonic cleaning unit.

Background of the Related Art

One of the most basic techniques in the semiconductor manufacturing process is a cleaning technique. The semiconductor manufacturing process goes through several steps to form the surface of a substrate, and since various contaminants are generated and remain on the semiconductor substrate and semiconductor manufacturing equipment where predetermined processes are performed in each step, the semiconductor substrate and semiconductor manufacturing equipment should be cleaned at regular time intervals to continue the process. Therefore, the cleaning technique is to remove various contaminants generated during the semiconductor manufacturing process using physical and chemical methods.

In this regard, the chemical method is to remove the contaminants on the surface by water washing, etching, oxidation-reduction reaction, or the like, which uses various chemicals or gases. In the chemical method, attached particles are removed with pure water or a cleaning liquid, and organic matters are dissolved with a solvent, removed with an oxidizing acid, or removed by carbonizing in oxygen plasma, and in some cases, a new clean surface is exposed by etching a predetermined part of the surface.

In the physical method, which is another method, attached materials are peeled off by ultrasonic energy, wiped out with a brush, or removed using high-pressure water. Generally, efficient cleaning is achieved by combining the physical and chemical methods.

That is, ultrasonic cleaning is a process of removing contaminants attached to an object to be cleaned using a physical (ultrasonic waves) or chemical means (cleaning liquid, cleaning solution), and preventing the removed contaminants not to be adhered again. The physical phenomenon generated by ultrasonic waves means that it is accomplished by a cavitation phenomenon of the ultrasonic waves, and the cavitation phenomenon is a phenomenon in which microbubbles are generated and destroyed by the pressure of the ultrasonic waves when ultrasonic energy propagates into the liquid, and is accompanied by very high pressure (tens to hundreds of atmospheric pressure) and high temperature (several hundred to thousands of degrees).

The phenomena described above are repeatedly generated and terminated within an extremely short period of time (tens of thousands of seconds to hundreds of thousands of seconds). By the impact waves, cleaning is accomplished in a short time even to an invisible place deep inside the object to be cleaned and submerged in the liquid.

In an actual case, in addition to the impact energy generated by cavitation, the agitation effect, thermal action, and the like generated by the radiation pressure of the ultrasonic waves themselves generates a synergistic effect together with detergents and achieves a high cleaning effect.

The ultrasonic cleaning is mainly used to clean or rinse objects to be cleaned, such as glass substrates used for liquid crystal display (LCD) devices, semiconductor substrates, magnetic disks for storing data, and the like. The ultrasonic waves apply vibration energy to the particles on the object to be cleaned so that the particles and other contaminants may be effectively removed from the object to be cleaned.

Recently, as semiconductor devices are highly integrated, the patterns to be implemented on the substrate are also reduced greatly in size. Therefore, importance of the cleaning process is emphasized more and more as the patterns on the substrate generate defects in the semiconductor devices even by micro particles.

Generally, substrate cleaning is performed using a cleaning liquid and ultrasonic waves, and is achieved by supplying the cleaning liquid to the surface or back surface of the substrate while rotating the substrate at a high speed while the substrate is supported on a chuck base of a substrate support device.

A plurality of guide pins is installed along the circumferential direction of the chuck base to prevent the substrate from escaping in the lateral direction of the chuck base when the chuck base rotates, and the substrate support device is configured to include the guide pins, the chuck base, a mechanical unit (mechanism), and a driving unit for driving the mechanical unit.

However, as an ultrasonic cleaning unit for applying ultrasonic waves to the substrate is small compared to the substrates getting bigger in size, unnecessary scanning movements are increased to cover by moving the entire substrate, and as a result, there is a problem in that the overall cleaning time is extended.

In addition, as structural interference between the guide pins protruding to be higher than the top surface of the substrate and the cleaning head in the scanning operation occurs at the edge portions of the substrate, there is a problem in that the ultrasonic cleaning power is lowered at the edge portions of the substrate.

SUMMARY OF THE INVENTION

Therefore, the present invention has been made in view of the above problems, and it is an object of the present invention to provide an ultrasonic cleaning unit with improved cleaning performance and a substrate cleaning apparatus including the same, which can improve overall substrate cleaning performance through improvement in the structure of a cleaning head of the ultrasonic cleaning unit.

To accomplish the above object, according to one aspect of the present invention, there is provided an ultrasonic cleaning unit comprising: a driving unit for receiving external power and vibrating an internal vibrator; and a cleaning head formed to protrude downward from the bottom of the driving unit to be acoustically coupled to the vibrator to transfer high-frequency acoustic energy to the cleaning liquid on a substrate, wherein an arc section formed to have a curvature corresponding to the outer circle of the substrate is included in the edge of the bottom surface of the cleaning head.

Preferably, the edge of the bottom surface of the cleaning head is configured of, to partition the edge of the bottom surface, two straight sections in a form of a straight line spaced apart to face each other in a horizontal direction, two arc sections in a form of an arc spaced apart to face each other in a vertical direction between the two straight sections, and four curved sections in a form of a curved line connecting the ends of the individual straight sections and the individual arc sections.

Preferably, the two straight sections are elements that determine the area of the bottom surface of the cleaning head, and the longer the length, the larger the area of the bottom surface of the cleaning head.

Preferably, the two arc sections are elements of the cleaning head in charge of the circumferential portions of the edge of the substrate, and are formed in a shape of part of a circle having a curvature corresponding to the outer circle of the substrate.

Preferably, the driving unit includes: a wiring terminal protruding on one side, into which an external power cable is inserted; a vibrator connected to the cable to vibrate according to application of power; a gas guide partitioned around an area where the vibrator is arranged; and a gas inlet and a gas outlet formed at one end and the other end of the gas guide to inject and discharge gas for controlling generation of heat.

Preferably, a step unit recessed inward along the arc sections is formed on the bottom surface of the cleaning head.

Preferably, the step unit is formed in only one or both of the two arc sections on the bottom surface of the cleaning head.

On the other hand, according to another aspect of the present invention, there is provided a substrate cleaning apparatus comprising: a substrate support device for rotating a substrate by a rotation driving mechanism while supporting the substrate; a fluid supply unit for supplying a cleaning liquid for processing the substrate onto the substrate of the substrate support device; and an ultrasonic cleaning unit according to any one of the features described above, for transferring high-frequency acoustic energy to the cleaning liquid on the substrate.

DETAILED DESCRIPTION OF THE PREFERRED EMBODIMENT

Figure 1:
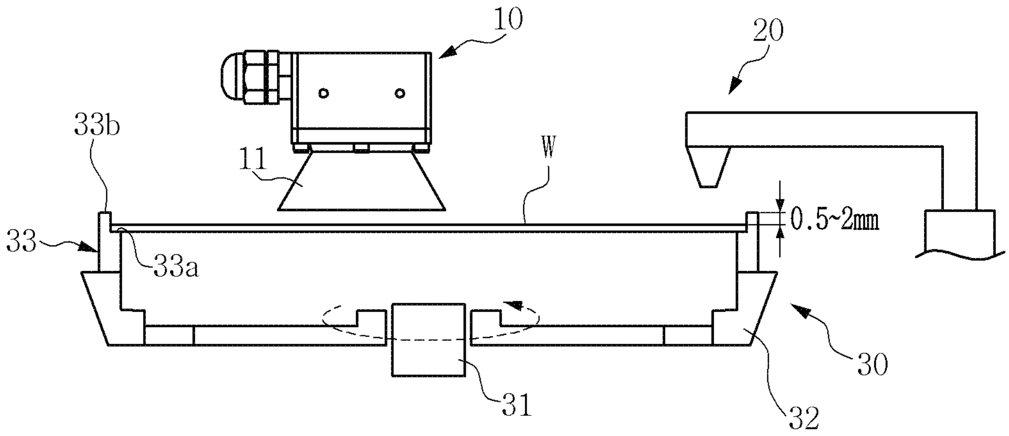
FIG. 1 is a view for explaining a substrate cleaning apparatus according to the prior art.

Since the present invention may make various changes and have various embodiments, specific embodiments will be illustrated in the drawings and described in detail in the detailed description. However, this is not intended to limit the present invention to specific embodiments, and should be understood to include all modifications, equivalents, and substitutes included in the spirit and technical scope of the present invention. Like reference numerals are used for like elements throughout the description of the drawings.

Although terms such as first, second, A, and B may be used to describe various components, the components should not be limited by the terms. These terms are used only for the purpose of distinguishing one component from another. For example, a first component may be named as a second component, and similarly, a second component may also be named as a first component without departing from the scope of the present invention. The term such as and/or includes a combination of a plurality of related items or any one of a plurality of related items.

It should be understood that when a component is referred to as being "connected" or "coupled" to another component, it may be directly connected or coupled to another component, but other components may exist therebetween. On the other hand, when a component is referred to as being "directly connected" or "directly coupled" to another component, it should be understood that no other component exists therebetween.

Terms used in this application are used only to describe specific embodiments, and are not intended to limit the present invention. Singular expressions include plural expressions unless the context clearly dictates otherwise. It should be understood that in this application, terms such as "include", "have", and the like are intended to specify presence of a feature, number, step, operation, component, part, or a combination thereof described in the specification, and do not preclude the possibility of presence or addition of one or more other features, numbers, steps, operations, components, parts, or combinations thereof.

Unless otherwise defined, all terms used herein, including technical or scientific terms, have the same meaning as commonly understood by those skilled in the art. Terms such as those defined in a commonly used dictionary should be interpreted as having a meaning consistent with the meaning in the context of the related art, and are not construed in an ideal or excessively formal sense unless explicitly defined in this application.

Hereinafter, preferred embodiments according to the present invention will be described in detail with reference to the accompanying drawings.

Figure 2:
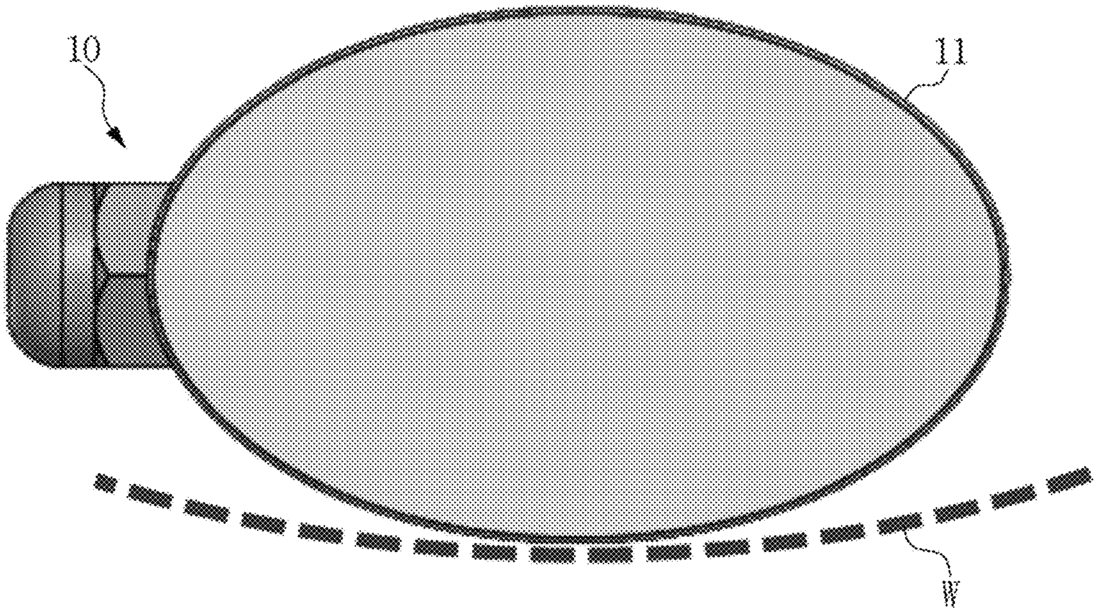
FIG. 2 is a view for explaining the shape of a lower cleaning head of an ultrasonic cleaning unit according to the prior art.

First, FIG. 1 is a view for explaining a substrate cleaning apparatus according to the prior art, and FIG. 2 is a view for explaining the shape of a lower cleaning head of an ultrasonic cleaning unit according to the prior art.

Referring to FIG. 1, a substrate cleaning apparatus according to the prior art is configured to include an ultrasonic cleaning unit 10, a fluid supply unit 20, and a substrate support device 30.

The substrate support device 30 performs a function of rotating the substrate W by a rotation driving mechanism while supporting the substrate W during the process.

The fluid supply unit 20 supplies a cleaning liquid for processing the substrate onto the substrate W.

The ultrasonic cleaning unit 10 is configured to includes a cleaning head 11 protruding downward. The cleaning head 11 is acoustically coupled to an internal vibrator (not shown). Therefore, high-frequency acoustic energy of the vibrator vibrating with sound waves or ultrasonic waves according to an external power source is transferred to the acoustically coupled cleaning head. As a result, the vibrator is electrically excited to vibrate, and the cleaning head 11 transfers high-frequency acoustic energy to the cleaning liquid on the substrate W. Bubble cavitation generated by ultrasonic/megasonic energy vibrates particles on the substrate W. Accordingly, contaminants are vibrated to be separated and removed from the surface of the substrate W by the flow of the cleaning liquid supplied from the fluid supply unit 20.

At this point, the substrate support device 30 receives rotational force of the rotating unit 31, and the chuck base 32 rotates in the horizontal direction. The chuck base 32 is provided with a plurality of guide pins 33 installed along the circumferential direction of the chuck base 32 to support the substrate W from the bottom to prevent the substrate W from escaping in the lateral direction.

Here, a seating unit 33*a* protruding to the lateral side toward the substrate W is formed on the lateral side of the guide pin 33 to support the substrate W from the bottom, and a blocking unit 33*b* protruding upward is formed on the top to prevent the rotating substrate W from escaping in the lateral direction, and the blocking unit 33*b* of the guide pin 33 protruding upward in this way protrudes up to a position higher than the top surface of the substrate W. For example, the blocking unit 33*b* of the guide pin 33 may protrude up to a position higher than the top surface of the substrate W as much as 0.5 to 2.0 mm.

Although the structure in which the blocking unit 33*b* of the guide pin 33 protrudes upward is an ideal structure to prevent the rotating substrate W from escaping in the lateral direction, there is a risk of contacting the cleaning head 11 of the ultrasonic cleaning unit 10, which scans the outer portion of the substrate W, in the cleaning process. Particularly, the ultrasonic cleaning unit 10 performs a scanning operation by positioning the cleaning head 11 to be closer to (to be lowered toward) the substrate W in order to improve the cleaning power, and the possibility of collision between the cleaning head 11 and the guide pin 33 having a structure protruding to be higher than the top of the substrate W inevitably increases when the cleaning head 11 approaches the outer portion of the substrate W during the scanning operation. That is, although it is ideal that the cleaning head 11 maintains a minimum distance (minimum height difference) so as not to be in contact with the substrate to improve the cleaning power, and the height of the protrusion on the top of the guide pin 33 is higher than the top surface of the substrate W in order to prevent separation of the substrate W, it always possible that the upper portion of the guide pin 33 is in contact with the edge portions of the bottom surface of the cleaning head 11.

In order to avoid the contact with the guide pins 33, it is general that a scan route is set for the ultrasonic cleaning unit 10 to limit the path to the edge of the substrate W or to refrain from entering the edge portion, and this results in lowering the cleaning efficiency in the edge portions of the substrate W.

In addition, FIG. 2 schematically shows a state of the lower cleaning head 11 of the ultrasonic cleaning unit 10 according to the prior art approaching the edge portions of the substrate W during the scanning process, by displaying the bottom surface of the lower cleaning head 11 and an edge portion of the wafer W together.

Generally, the bottom surface of the cleaning head 11, which transfers high-frequency acoustic energy to the cleaning liquid on the substrate W, is formed in an elliptical shape to improve the scanning efficiency. In addition, the substrate W is formed in a circular shape.

Although a small circular substrate W does not make a big problem in designing a route for scanning through the elliptical cleaning head 11, as the substrates W getting bigger in size recently require repeated and overlapped movement of the cleaning head 11 in the edge portions of the substrate W to thoroughly clean even the edge portions of the substrate W with the existing cleaning head 11, it may cause over-cleaning in the edge portions of the substrate W, in addition to lowering the scan speed.

Figure 3A:
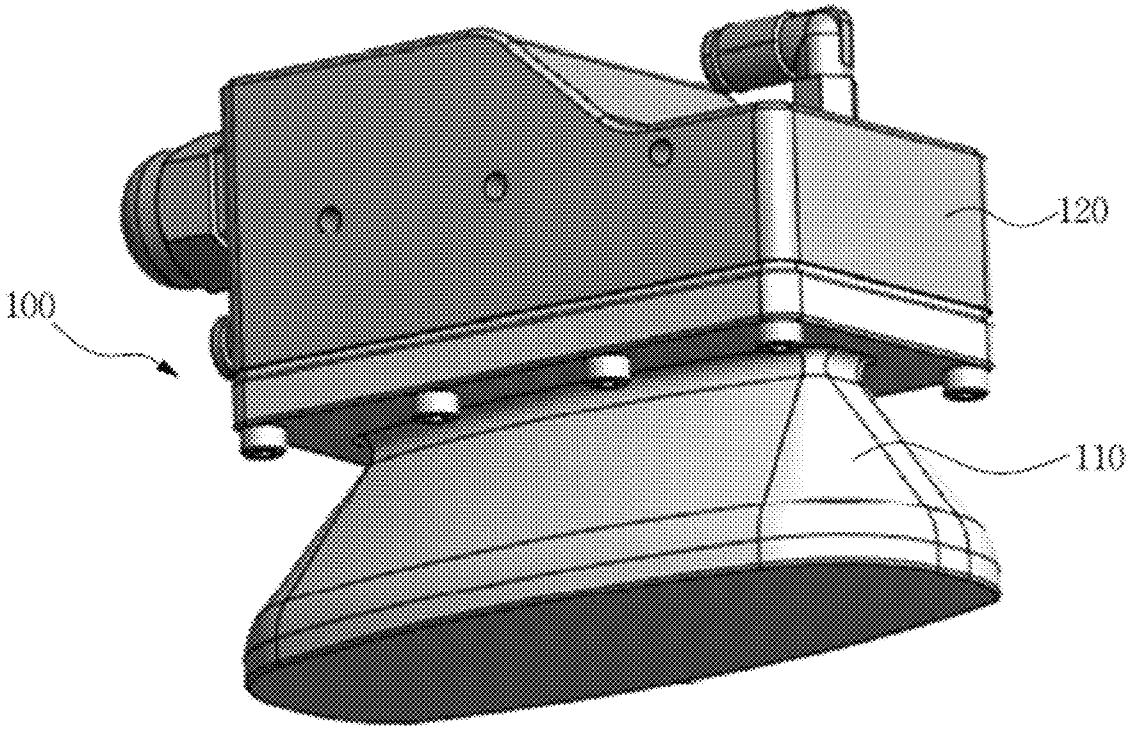
FIGS. 3(*a*)-3(*b*) are views for explaining an ultrasonic cleaning unit according to an embodiment of the present invention.
Figure 3B:
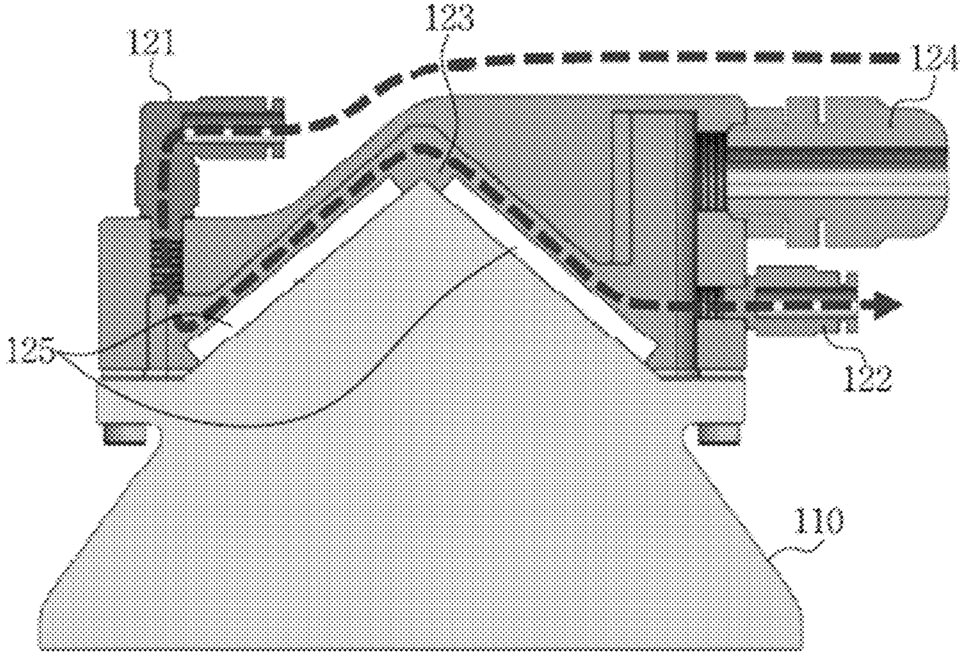

FIGS. 3(*a*)-3(*b*) are views for explaining an ultrasonic cleaning unit according to an embodiment of the present invention.

The ultrasonic cleaning unit 100 improved according to an embodiment of the present invention shown in FIGS. 3(*a*)-3(*b*) allows the existing substrate cleaning apparatus including the substrate support device 300 and the fluid supply device 200 to be applied as is without mechanically modifying the substrate cleaning apparatus.

The ultrasonic cleaning unit 100 may be configured to include a driving unit 120 for receiving external power and vibrating an internal vibrator 125, and a cleaning head 110 formed to protrude downward from the bottom of the driving unit 120 to be acoustically coupled to the vibrator 125 to transfer high-frequency acoustic energy to the cleaning liquid on the substrate W.

FIG. 3(*a*) is a perspective view showing the ultrasonic cleaning unit 100 in a state in which the driving unit 120 on the upper side is coupled yo the cleaning head 110 on the lower side, and FIG. 3(*b*) is a cross-sectional view showing the coupled state.

Referring to FIGS. 3(*a*)-3(*b*), the driving unit 120 may be configured to include a wiring terminal 124 protruding on one side, into which an external power cable is inserted, a vibrator 125 connected to the cable to vibrate according to application of power, a gas guide 123, which is an empty space partitioned around an area where the vibrator 125 is arranged, and a gas inlet 121 and a gas outlet 122 formed at one end and the other end of the gas guide 123 to inject and discharge gas for controlling generation of heat.

Here, the gas flowing along the gas guide 123 may control the heat generated by the vibrator 125, and CDA, $N_2$, inert gas, or the like may be used.

Since the cleaning head 110 coupled on the bottom of the driving unit 120 is acoustically coupled to the vibrator 125, and configured to have a cross-sectional area getting wider toward the bottom, high-frequency acoustic energy generated by the vibrator 125 is transferred to the cleaning liquid on the substrate W through the wide bottom surface.

Figure 4A:
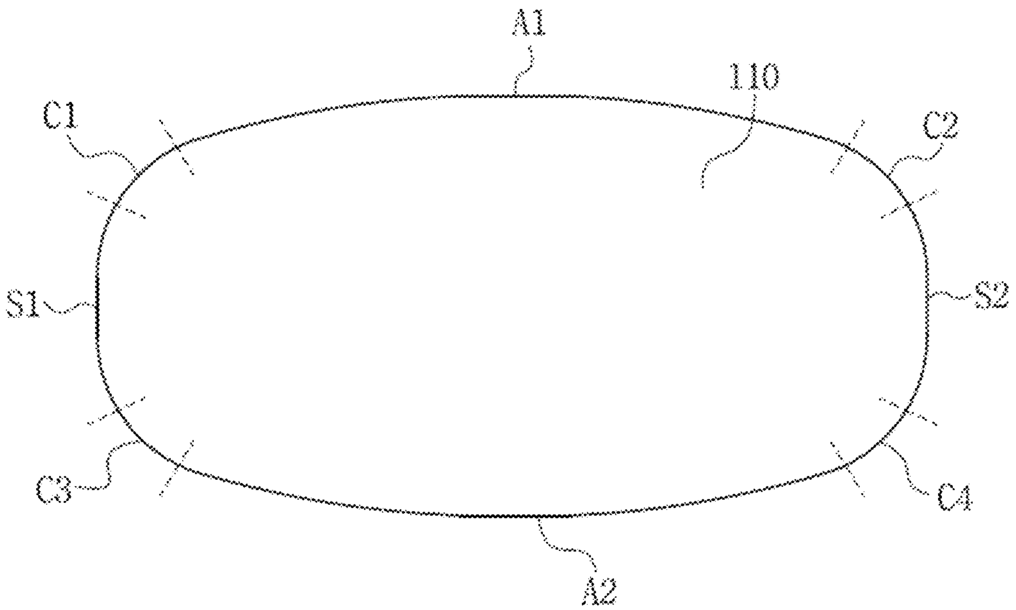
FIGS. 4(*a*)-4(*b*) are views for explaining the shape of a lower cleaning head of an ultrasonic cleaning unit according to an embodiment of the present invention.
Figure 4B:
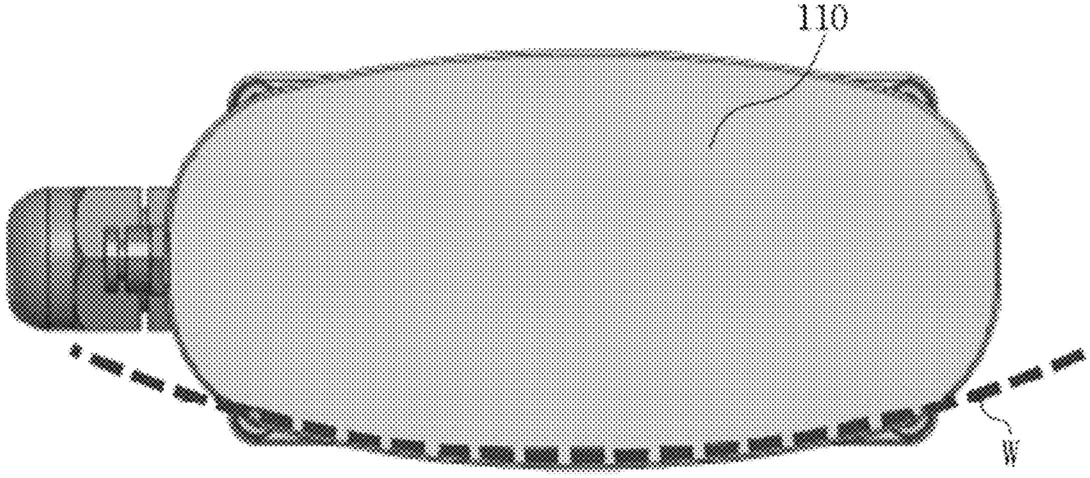

FIGS. 4(*a*)-4(*b*) show the shape of the lower cleaning head 110 of the ultrasonic cleaning unit 100.

First, FIG. 4(*a*) shows the shape of the edge of the bottom surface of the cleaning head 110 by sections.

The edge of the bottom surface of the cleaning head 110 is configured of, to partition the edge of the bottom surface, two straight sections S1 and S2 in the form of a straight line spaced apart to face each other in the horizontal direction, two arc sections A1 and A2 in the form of an arc spaced apart to face each other in the vertical direction between the two straight sections S1 and S2, and four curved sections C1, C2, C3, and C4 in the form of a curved line connecting the ends of the individual straight sections S1 and S2 and the individual arc sections A1 and A2.

The two straight sections S1 and S2 are elements that directly determine the area of the bottom surface of the cleaning head 110, and the longer the length, the larger the area of the bottom surface of the cleaning head 110. Here, the two straight sections S1 and S2 are preferably straight lines, but may have a shape of a gentle elliptic curve.

The two arc sections A1 and A2 are elements of the cleaning head 110 in charge of the circumferential portions of the edge of the substrate W, and are formed to have the same curvature as the outer circle of the substrate W. That is, the two arc sections A1 and A2 are part of a circle having the same radius as the outer circle of the substrate W. The radius of the outer circle of the substrate W is the same as the radius of curvature of the two arc sections A1 and A2. Therefore, for a large area substrate W actually having a large radius, the virtual radius that makes the two arc sections A1 and A2 will be equally large, and for a small-to-medium area substrate W having a radius smaller than the large radius, the virtual radius that makes the two arc sections A1 and A2 will be equally small. As a result, substrates W of all sizes may be conveniently processed by changing the curvature of the two arc sections A1 and A2 according to the size of a substrate W to be processed.

The four curved sections C1, C2, C3, and C4 are formed in a curved shape to smoothly connect the individual straight sections S1 and S2 and the individual arc sections A1 and A2.

FIG. 4(*b*) schematically shows a state of the lower cleaning head 110 of the ultrasonic cleaning unit 100 according to the present invention approaching the edge portions of the substrate W during the scanning process, by displaying the bottom surface of the lower cleaning head 110 and an edge portion of the wafer W together.

Referring to FIG. 4(*b*) in comparison with FIG. 2, in the conventional cleaning head 11 of a simple elliptical shape as shown in FIG. 2, since the portions facing the edge portions (circumference of the circle) of the substrate W are small, repeated and overlapped movement of the cleaning head 11 is required to scan all the edge portions of the substrate W, but in the cleaning head 110 of the present invention having two arc sections A1 and A2 having the same curvature as the outer circle of the substrate W as shown in FIG. 4(*b*), since the edge portions (circumference of the circle) of the substrate W are exactly facing the arc sections A1 and A2, the overall scanning speed may be drastically reduced as the overlapped movement of the cleaning heads 11 is reduced, and over-cleaning in the edge portions of the substrate W can be prevented.

Figure 5:
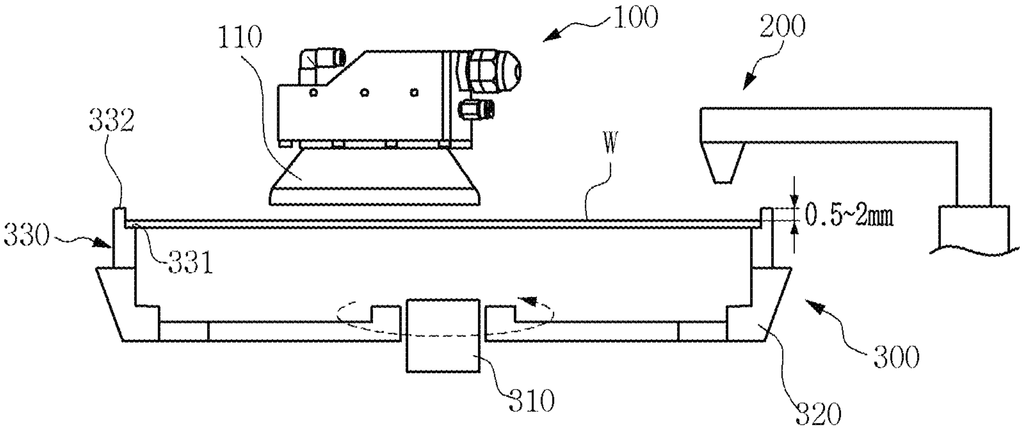
FIG. 5 is a view for explaining a substrate cleaning apparatus including an ultrasonic cleaning unit according to an embodiment of the present invention.

Next, FIG. 5 is a view for explaining a substrate cleaning apparatus including an ultrasonic cleaning unit according to an embodiment of the present invention.

Referring to FIG. 5, a substrate cleaning apparatus according to the present invention is configured to include an ultrasonic cleaning unit 100, a fluid supply unit 200, and a substrate support device 300.

The substrate support device 300 performs a function of rotating the substrate W by a rotation driving mechanism while supporting the substrate W during the process.

The fluid supply unit 200 supplies a cleaning liquid for processing the substrate onto the substrate W.

The ultrasonic cleaning unit 100 improved according to an embodiment of the present invention allows the existing substrate cleaning apparatus including the substrate support device 300 and the fluid supply device 200 to be applied as is without mechanically modifying the substrate cleaning apparatus.

As described above, the ultrasonic cleaning unit 100 may be configured to include a driving unit 120 for receiving external power and vibrating an internal vibrator 125, and a cleaning head 110 formed to protrude downward from the bottom of the driving unit 120 to be acoustically coupled to the vibrator 125 to transfer high-frequency acoustic energy to the cleaning liquid on the substrate W.

At this point, the substrate support device 300 receives rotational force of the rotating unit 310, and the chuck base 320 rotates in the horizontal direction. The chuck base 320 is provided with a plurality of guide pins 330 installed along the circumferential direction of the chuck base 320 to support the substrate W from the bottom to prevent the substrate W from escaping in the lateral direction.

Here, a seating unit 331 protruding to the lateral side toward the substrate W is formed on the lateral side of the guide pin 330 to support the substrate W from the bottom, and a blocking unit 332 protruding upward is formed on the top to prevent the rotating substrate W from escaping in the lateral direction, and the blocking unit 332 of the guide pin 330 protruding upward in this way protrudes up to a position higher than the top surface of the substrate W. For example, the blocking unit 332 of the guide pin 330 may protrude up to a position higher than the top surface of the substrate W as much as 0.5 to 2.0 mm.

Figure 6:
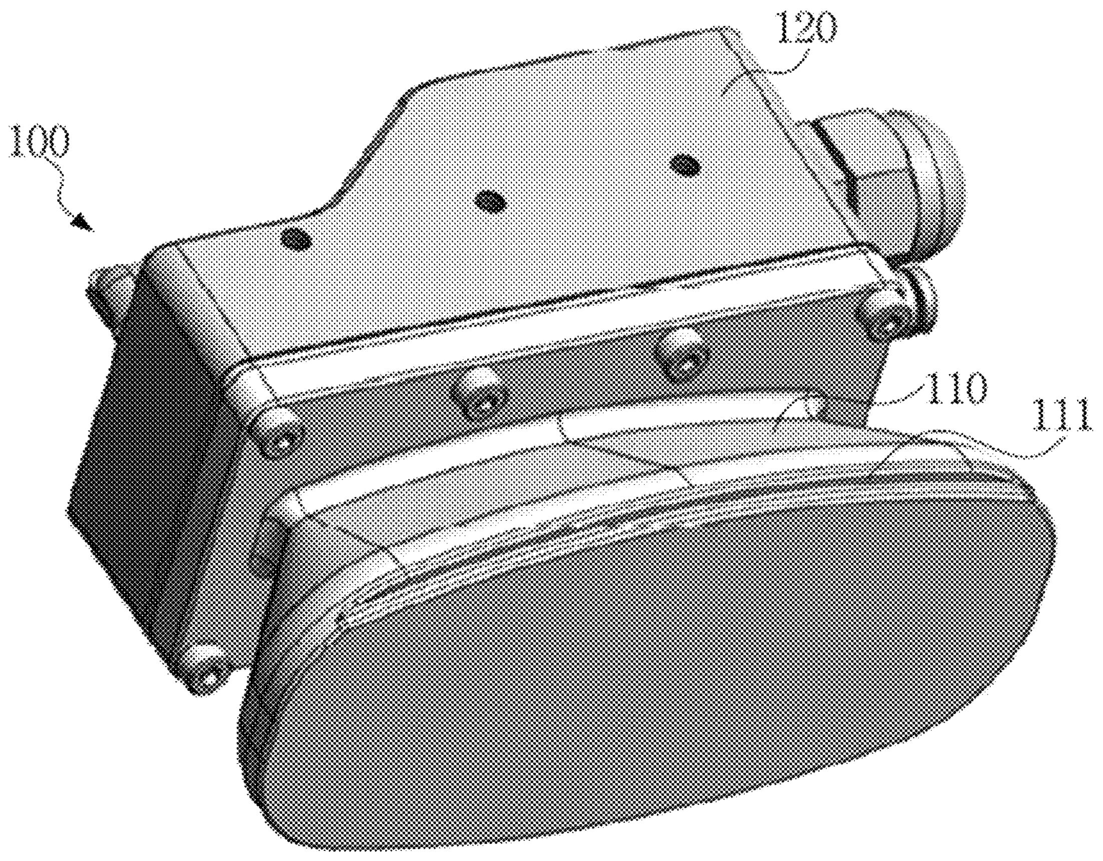
FIG. 6 is a view for explaining the shape of a step unit of an ultrasonic cleaning unit according to an embodiment of the present invention.

FIG. 6 is a view for explaining the shape of a step unit of an ultrasonic cleaning unit according to an embodiment of the present invention.

As shown in FIG. 6, according to an embodiment of the present invention, a step unit 111 recessed inward along the arc sections A1 and A2 may be formed on the bottom surface of the cleaning head 110.

Figure 7:
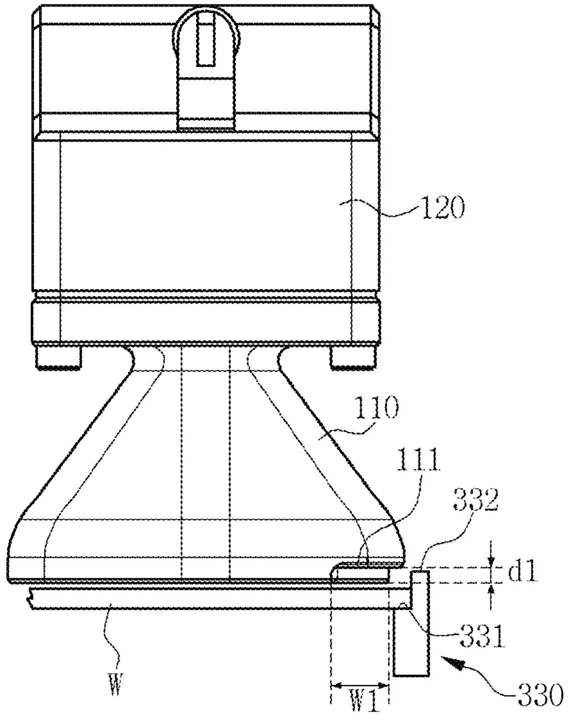
FIGS. 7 and 8 are views for explaining the shapes of an ultrasonic cleaning unit applied with two types of step units according to an embodiment of the present invention.

Referring to FIG. 7, the width w1 of the recessed portion of the step unit 111 may correspond to the thickness of the protruding blocking unit 332 of the guide pin 330, and may be preferably formed to be larger than the thickness of the blocking unit 332.

In addition, the depth dl of the recessed portion of the step unit 111 may correspond to the protruding height of the protruding blocking unit 332 of the guide pin 330, and is preferably formed to be deeper than the height of the blocking unit 332 protruding to be higher than the substrate W.

As the step unit 111 is provided, the structural interference of the cleaning head 110 with the guide pin 330 supporting the substrate W may be completely avoided. That is, although the arc sections A1 and A2 of the cleaning head 110 move to the edge portions of the substrate during the scanning operation, the cleaning head 110 does not come into contact with the guide pin 330 due to the recessed step unit 111.

Figure 10:
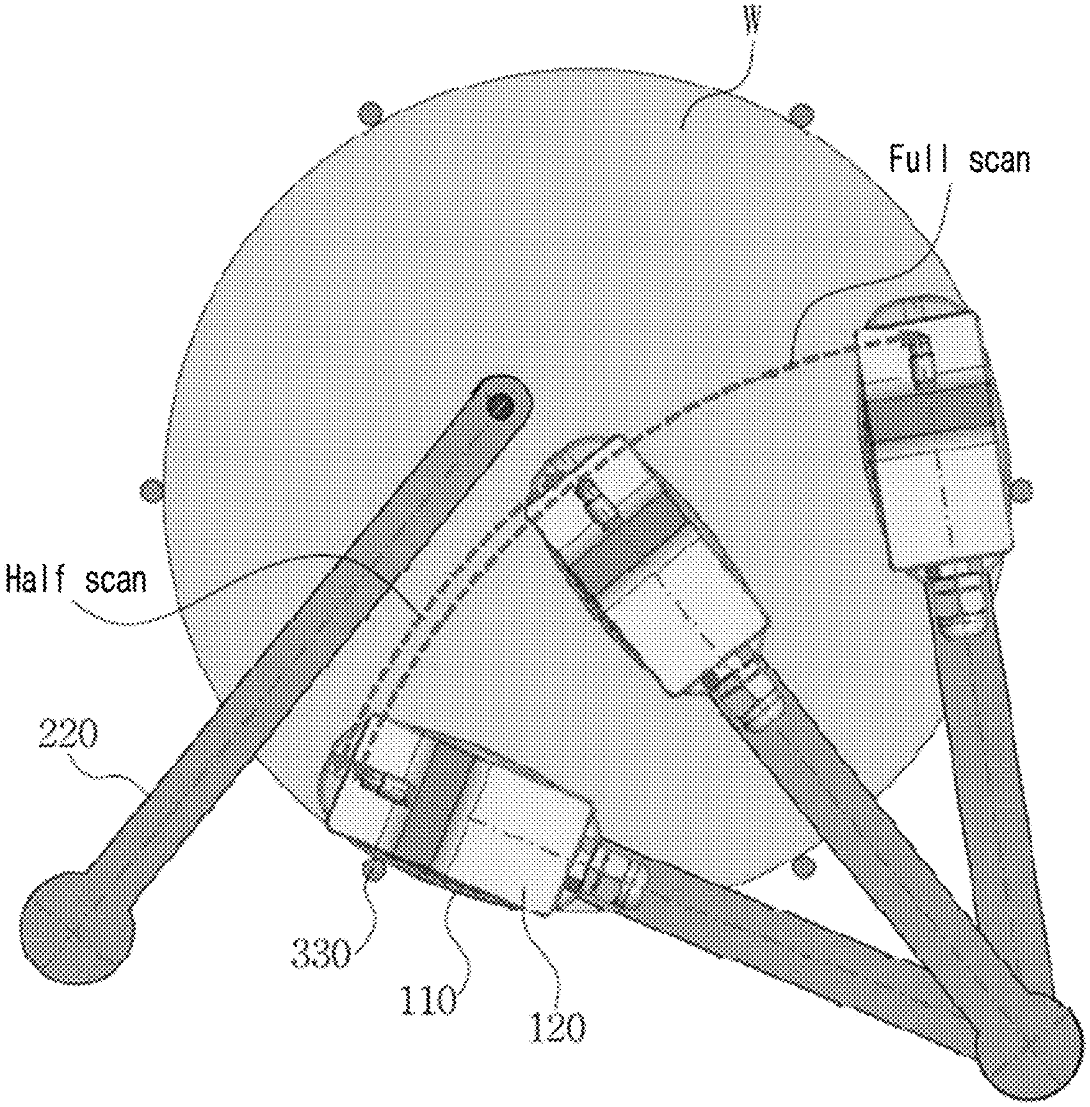
FIG. 10 is a view for explaining a process of scanning a substrate through an ultrasonic cleaning unit according to an embodiment of the present invention.

As shown in FIG. 7, the step unit 111 may be formed only in one of the two arc sections A1 and A2 on the bottom surface. This may be applied to a half scan method in which the cleaning head 110 repeatedly moves from the center of the substrate W to an edge among the two scanning operations shown in FIG. 10. At this point, the place where the step unit 111 is formed among the two arc sections A1 and A2 will be a section facing the edge of the substrate W.

Figure 8:
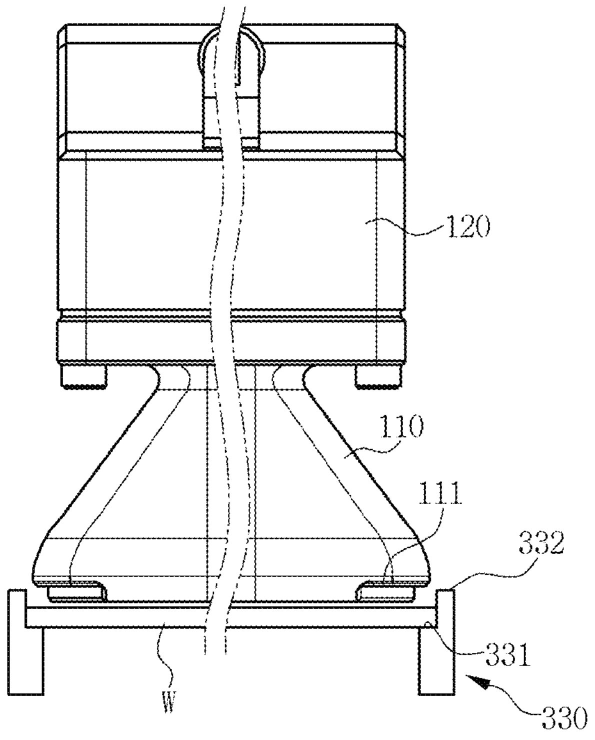

In addition, as shown in FIG. 8, the step unit 111 may be formed in both of the two arc sections A1 and A2 of the bottom surface. This may be applied to a full scan method in which the cleaning head 110 moves from one edge portion of the substrate W to the other edge portion in the diameter range among the two scanning operations shown in FIG. 10.

Figure 9:
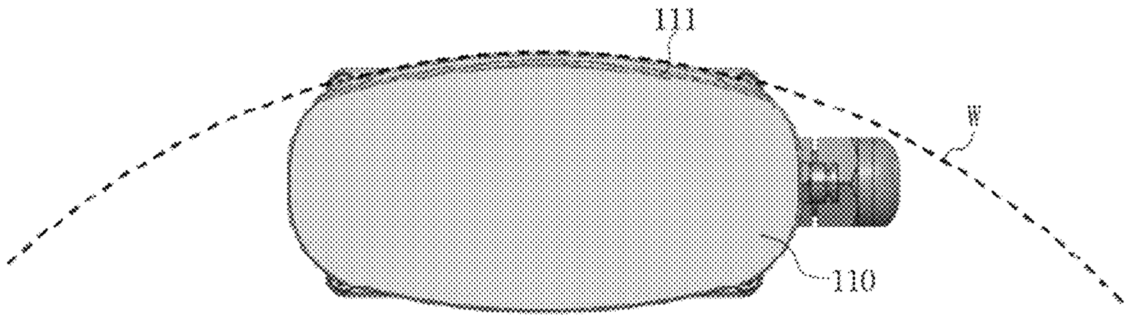
FIG. 9 is a view for explaining the shape of a step unit of an ultrasonic cleaning unit according to an embodiment of the present invention.

In the example of FIG. 7 in which the step unit 111 is formed only in one of the two arc sections A1 and A2, since the cleaning head 110 is not in contact with the guide pin 330 due to the step unit 111, the cleaning head 110 may perform the scanning operation as far as the end of the edge of the substrate W as shown in FIG. 9.

Figure 11:
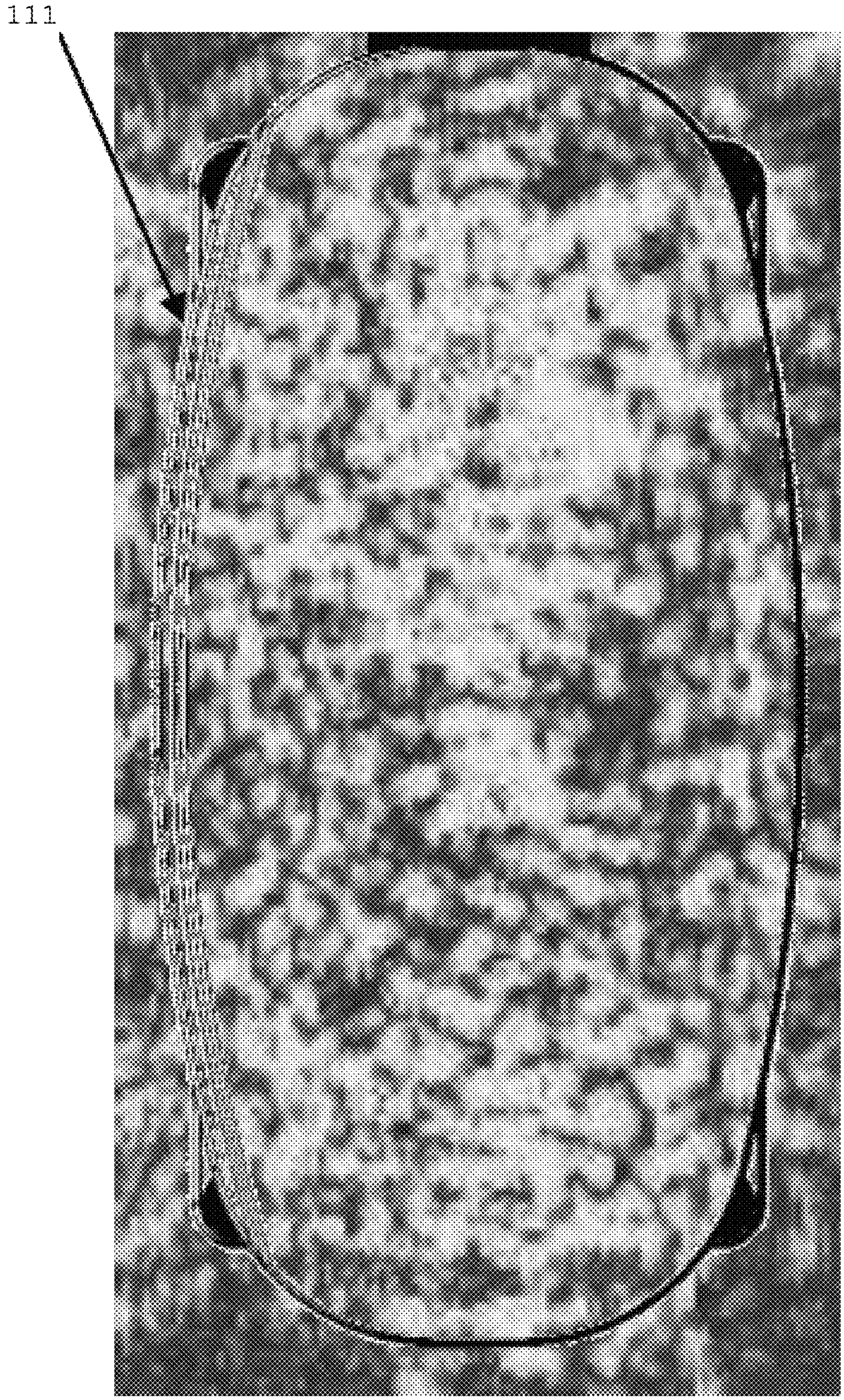
FIG. 11 is a view showing a sound pressure distribution image of an ultrasonic cleaning unit according to an embodiment of the present invention.

In addition, in the example of FIG. 7 in which the step unit 111 is formed only in one of the two arc sections A1 and A2, as can be seen in the sound pressure distribution image shown in FIG. 11, it can be experimentally confirmed that a sufficient sound pressure distribution is also formed in the portion where the step unit 111 of the cleaning head 110 is formed (indicated by an arrow), and as a result, this eventually means that deterioration of the cleaning power of the cleaning head 110 does not occur as the step unit 111 is formed.

As the step unit 111 is formed on the bottom surface of the cleaning head 110, cleaning efficiency in the edge portions of the substrate W will be improved eventually, and as the degree of cleaning is equal on the overall substrate W, the cleaning quality is improved.

As described above, an optimal embodiment has been disclosed in the drawings and specifications. Although specific terms are used herein, they are only used for the purpose of describing the present invention and not to limit the meaning and restrict the scope of the present invention described in the claims. Therefore, those skilled in the art will understand that various modifications and equivalent other embodiments are possible therefrom. Therefore, the true technical protection scope of the present invention should be determined by the technical spirit of the appended claims.

According to the present invention, there is an effect of improving overall substrate cleaning performance through improvement in the structure of a cleaning head of an ultrasonic cleaning unit.

Particularly, as unnecessary scanning movement of the cleaning head is prevented by forming the shape of the edge portions of the contact surface of the lower cleaning head of the ultrasonic cleaning unit to correspond to the shape of the edge portions of the substrate, there is an effect of reducing the overall cleaning time and improving cleaning efficiency.

In addition, as the structural interference with the guide pin is avoided by placing a step unit of a recessed form on the edge of the contact surface of the lower cleaning head of the ultrasonic cleaning unit, there is an effect of improving cleaning efficiency in the edge portions of the substrate.

In addition, as the scanning speed is decreased as the lower cleaning head of the ultrasonic cleaning unit approaches the edge portions of the substrate, there is an effect of improving cleaning efficiency in the edge portions of the substrate.

DESCRIPTION OF SYMBOLS

| | |
|---|---|
| 100: Ultrasonic cleaning unit | 110: Cleaning head |
| 111: Step unit | 120: Driving unit |
| 121: Gas inlet | 122: Gas outlet |

-continued

| | |
|---|---|
| 123: Gas guide | 124: Wiring terminal |
| 125: Vibrator | 200: Fluid supply unit |
| 300: Substrate support device | 310: Rotating unit |
| 320: Chuck base | 330: Guide pin |
| 331: Seating unit | 332: Blocking unit |

What is claimed is:

1. An ultrasonic cleaning unit comprising:

a driving unit for receiving external power and vibrating a vibrator; and a cleaning head formed to protrude downward from a bottom of the driving unit and acoustically coupled to the vibrator to transfer acoustic energy to a cleaning liquid on a substrate, wherein two arc sections, each having a curvature corresponding to an outer circle of the substrate, are included in an edge of a bottom surface of the cleaning head, wherein the driving unit includes:

a wiring terminal protruding from one side thereof and configured to receive an external power cable;

the vibrator connected to the external power cable and configured to vibrate in response to applied power;

a gas guide partitioned around an area where the vibrator is arranged; and a gas inlet and a gas outlet disposed at respective ends of the gas guide to inject and discharge gas for controlling generation of heat.

2. The unit according to claim 1, wherein the edge of the bottom surface of the cleaning head includes two straight sections in a form of a straight line spaced apart to face each other in a horizontal direction, the two arc sections in a form of an arc spaced apart to face each other in a vertical direction between the two straight sections, and four curved sections in a form of a curved line connecting respective ends of the respective two straight sections and the respective two arc sections.

3. The unit according to claim 2, wherein the two straight sections are elements that determine an area of the bottom surface of the cleaning head, and the longer the length, the larger the area of the bottom surface of the cleaning head.

4. The unit according to claim 2, wherein the two arc sections are disposed along circumferential portions of an edge of the substrate, and are formed in a shape of part of a circle having a curvature corresponding to the outer circle of the substrate.

5. The unit according to claim 1, wherein the bottom surface of the cleaning head includes a step recessed inwardly along at least one of the two arc sections.

6. A substrate cleaning apparatus comprising:

the ultrasonic cleaning unit according to claim 1;

a substrate support device for rotating the substrate by a rotation driving mechanism while supporting the substrate; and a fluid supply unit for supplying the cleaning liquid for processing the substrate onto the substrate of the substrate support device.

* * * * *